Figure 1:
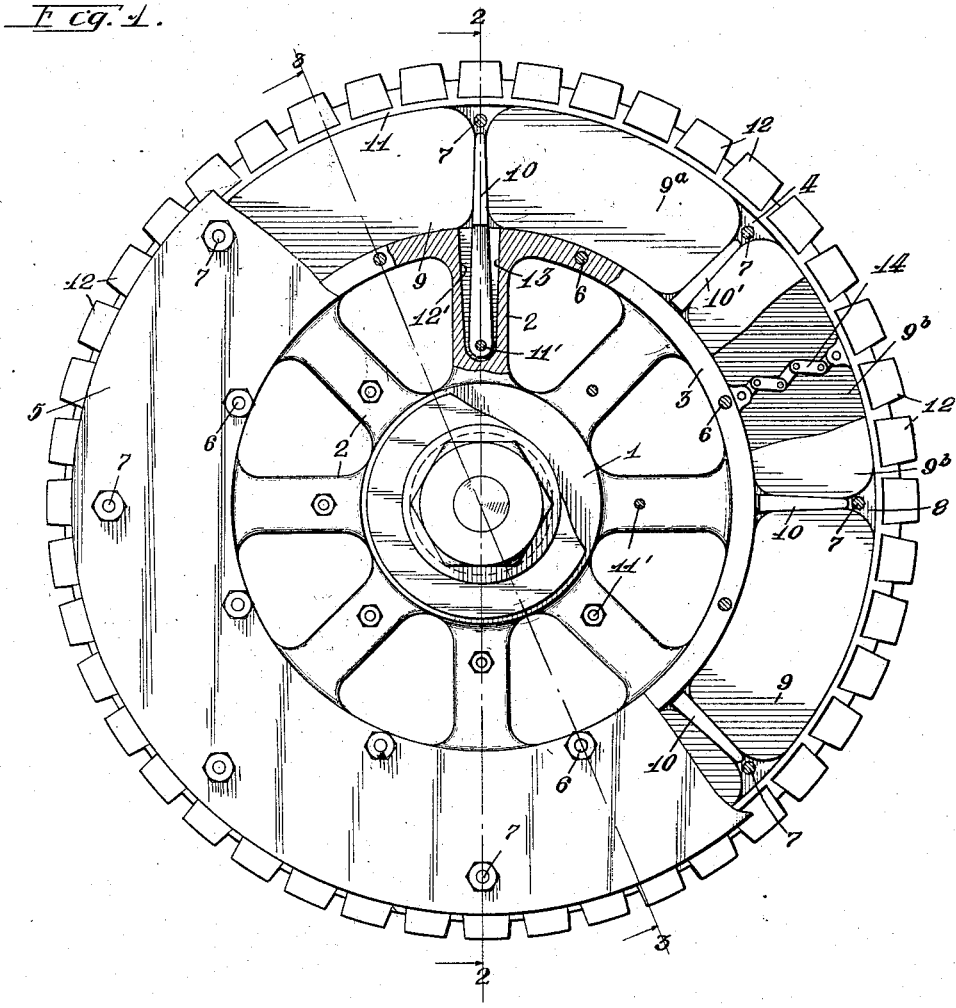
Figure 5:
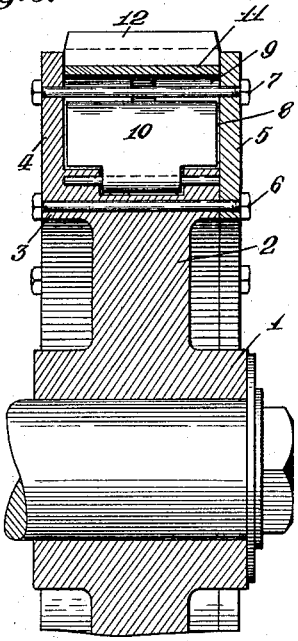
Figure 3:
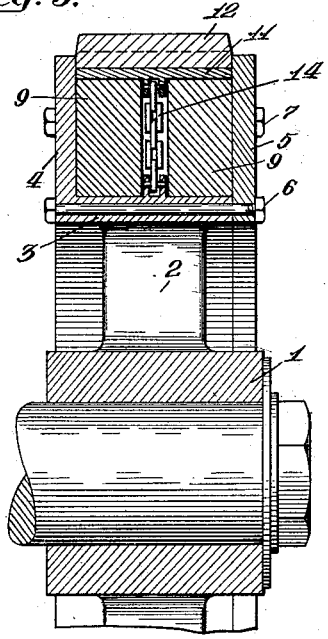
Figure 4:
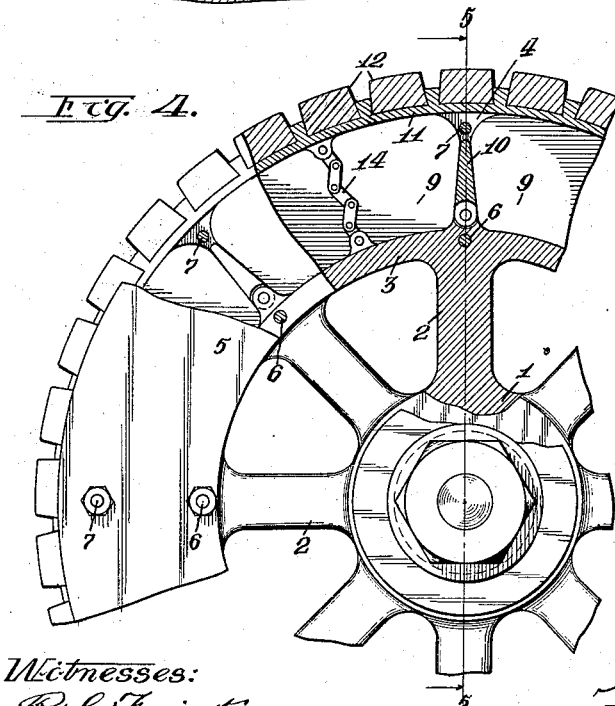
Figure 2:
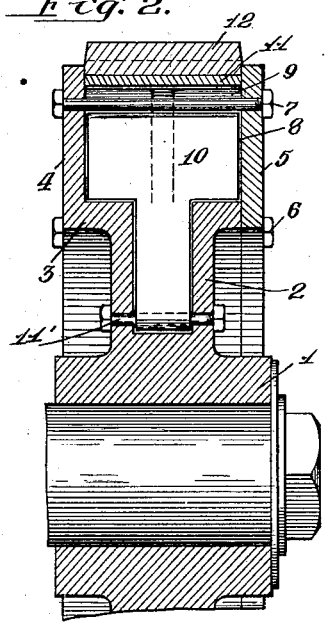

F. A. FROMMANN.
VEHICLE WHEEL.
APPLICATION FILED NOV. 29, 1912.

1,201,715.

Patented Oct. 17, 1916.
2 SHEETS—SHEET 1.

F. A. FROMMANN.
VEHICLE WHEEL.
APPLICATION FILED NOV. 29, 1912.

1,201,715.

Patented Oct. 17, 1916.
2 SHEETS—SHEET 2.

Witnesses:

Inventor:
Franklin A. Frommann
by Rudolph M. Fo
Attorney.

UNITED STATES PATENT OFFICE.

FRANKLIN A. FROMMANN, OF CHICAGO, ILLINOIS, ASSIGNOR TO OLIVE FROMMANN, OF CHICAGO, ILLINOIS.

VEHICLE-WHEEL.

1,201,715.  Specification of Letters Patent.  Patented Oct. 17, 1916.

Application filed November 29, 1912. Serial No. 734,086.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels in which part or all of the desired resiliency is obtained through the interposing of cushioning members positioned intermediate of the tread-rim formation and an inner rigid rim, whereby the wear on the wheel may be diverted from the resilient cushioning members to inexpensive and easily replaceable tread blocks upon the outer rim.

One form of such a vehicle construction was described and claimed in Letters Patent No. 1009062, granted to me November 21, 1911. My present application relates to a further improvement in vehicle wheels and is particularly applicable for use in conjunction with the tread-rim construction disclosed and claimed in my companion application, filed Dec. 4, 1912, as Serial No. 734,875.

The object of my invention is to provide a vehicle wheel in which any one of a plurality of cushioning members, interposed between an inner rim of the wheel and the outer tread-rim formation, may coöperate with other cushioning members, thereby distributing the strains and insuring a wheel action devoid of jerking; also whereby the cushioning medium may be built in comparatively small sections to reduce the initial cost as well as the expense of replacing any damaged portion.

A further object of my invention is to provide a wheel construction in which the rim or tire formation will have considerable freedom of motion both circumferentially with respect to the side plates of the wheel, and radially with respect to the hub or shaft, thereby permitting the elasticity of the cushioning mediums to be fully utilized; yet one in which this motion of the rim formation will be limited so as not to interfere with the exercise of the desired tractive power of the wheel.

I attain these objects by the construction shown in the accompanying drawings, in which—

Figure —1— is a view in side elevation, partly in section, of a vehicle wheel embodying my invention. Fig. —2— is a fragmentary detail section of the same substantially on the line 2—2 of Fig. —1—. Fig. —3— is a fragmentary detail sectional view of the same on the line 3—3 of Fig. —1—. Fig. —4— is a fragmentary view similar to Fig. —1— showing a modified form of construction. Fig. —5— is a fragmentary detail sectional view substantially on the line 5—5 of Fig. —4—.

In the embodiment shown in Figs. —1—, —2— and —3—, I employ a central member consisting substantially of a complete wheel construction, comprising a hub 1 having hollow spokes 2 integral with the hub and also integral with a rim 3, which rim is preferably cylindrical in its outward configuration. The rim 3 is provided at its opposite edges with annular flanges 4 and 5 extending outwardly from the said rim. One of these flanges (4) is preferably cast integral with the rim 3, while the companion flange (5) is preferably secured to the rim by bolts 6 and 7 extending through the integrally cast flange 4. When the separable flange 5 is thus secured in its normal position, the space 8 intermediate of the rigid flanges 4 and 5 and external of the rim 3 constitutes an annular channel adapted to receive a plurality of cushioning blocks 9. The cushions 9 are preferably made of rubber or of such other resilient material as is adapted to change its relative dimensions when subjected to pressure in one direction. The annular channel 8 is divided into a plurality of compartments by plates 10 pivoted within the hollow spokes 2 and extending beyond the rim 3 in a substantially radial direction. Each of the cushions 9 is so shaped as substantially to fill one of the aforesaid compartments and to project some distance beyond the same radially; that is to say, each cushion 9 rests at its base upon the rim 3, bears at its sides against the side plates or flanges 4 and 5, abuts at its ends against plates 10 and extends radially above the ends of the said plates 10. External to the said plurality of cushions 9, when thus positioned in substantially annular formation in the pockets 8, I provide a continuous tire 11 of such diameter and width as also to be engaged and guided laterally by the flanges 4 and 5. This tire 11 preferably fits snugly against the outer or circumferential surfaces of the cushions 9 when the parts are assembled, and is equipped on its outer face with tread blocks 12. The tire 11 is preferably made of metal of sufficient rigidity as to be relatively unyielding, so that it may move bodily relatively to the wheel body and in directions radially of the latter.

When the various elements of my wheel construction are thus assembled, the rubber cushions 9 constitute a substantially continuous resilient ring formation in which the consecutive parts are separated from one another by the pivoted plates 10, which plates are substantially as wide near their outer ends as the distance between the flanges 4 and 5. Now if pressure is brought upon one of the cushions 9 in a radial or centripetal direction (as by forcing one point of the tire 11 toward the hub 1 in the direction of line 3—3 on Fig. —1—) the cushion 9 will be reduced in its radial dimension. To compensate for this, it must expand in other directions, and as the side flanges 4 and 5 prevent its distending laterally, the cushion can only expand circumferentially or against the plates 10 adjacent to its ends. Since each of these plates 10 is pivotally mounted upon a bolt 11, this circumferential pressure of the adjoining cushion against each plate will cause the latter to swing upon its pivot and exert a circumferential pressure upon the end of the cushion 9ª at the other side of the said plate 10. The cushion 9ª in turn will exert a part of this endward pressure upon it in moving the plate 10' against which it abuts at its other end, thereby transmitting some of a pressure to the cushion 9ᵇ and so on. Likewise, the pressure upon the cushion 9 will also cause this to distend in the other direction and the pivotal mounting of the partition against which it abuts in this other direction will allow the strain to be transmitted to the adjacent cushion in the part of the wheel shown in Fig. —1— as covered by a portion of the removable side flange 5. However, the inner end of each partition 10 is housed in a deep socket formed in an adjacent spoke 2, so that the sides 12 and 13 of this socket will serve as stops to limit the motion of the partition in either direction. Hence, while the distending of the resilient cushioning members enables them to share their resilience with the other cushions, they will not be slid around the rim as might be the case if they were all united into an integral rubber ring. Likewise, the tire 11 is limited in its circumferential motion relatively to the rim 3 by the connecting members 14, which are preferably of link-chain formation. Consequently, the forces called into play when the wheel is in use may produce slight circumferential motions of the tire, cushions and rim relative to each other, but these motions will always be limited by the stops 12 and 13 and the flexible chain connections, so that they cannot prevent the wheel from exercising its full tractive power.

While the wheel of my invention is preferably made with deeply channeled or bifurcated spokes, thereby permitting the partitions to swing a considerable distance while moving through a comparatively small angle about their pivots, I do not wish to be limited to this construction. Thus, the partitions might be greatly shortened, as in Fig. —5—, in which case the spokes are made solid and the partitions are pivoted at the juncture of the spokes and rims. Neither do I wish to be limited to other details as shown and described, it being evident that numerous modifications might be made in the construction, design and arrangement of the various parts without departing from the spirit of my invention.

Particularly do I not wish to be limited to the use of rubber as a cushioning material, since it will be obvious that the principle of my invention would apply equally well with constructions embodying cushioning members made of other materials, provided that these materials are both distensible and resilient.

It will be understood, of course, that the chains 14 may be omitted if desired and in all probability will seldom be employed as a slow creeping of the rim relatively to the wheel body is not necessarily disadvantageous.

What I claim as new and desire to cover by Letters Patent is:

1. A wheel including an inner rim provided at its sides with outwardly extending annular flanges; a plurality of hollow spokes rigidly connected to the rim; a partition pivoted at its inner end with each of the said hollow spokes, each partition extending in a substantially radial direction beyond the inner rim into the annular channel bounded by the rim and the said flanges, whereby the partitions divide the said channel into circumferentially arranged compartments; a cushioning member inserted in each of the said compartments; and a tire encircling the said cushioning members, the tire being laterally guided by the said flanges.

2. In a wheel, the combination with a plurality of hollow spokes supporting a rim, of an outer tire movable with respect to the said rim; pivoted partitions mounted in the said hollow spokes and projecting beyond the rim; and cushioning members positioned in annular formation between the rim and tire, the ends of each adjacent pair of the said cushioning members abutting against opposite sides of one of the said partitions.

3. A wheel including a rim having a cylindrical outer surface; a tire movable with respect to the rim and equipped with a cylindrical inner surface; a plurality of cushioning members positioned in annular formation intermediate of the said cylindrical surfaces of the tire and rim, the radially inner and outer surfaces of the said cushioning members forming parts of substantially cylindrical surfaces bearing respectively against the said surfaces of the inner rim and tire; and pivoted partitions interposed between the adjacent ends of consecutive cushioning members, each of the said partitions extending in a substantially radial direction from its pivot.

4. A wheel including an inner rim; a tire movable with respect to the rim; a plurality of cushioning members positioned in annular formation intermediate of the tire and the rim; and partitions interposed between the adjacent ends of consecutive cushioning members, each of the said partitions being free at one end and pivoted at its other end upon a pivot substantially parallel to the axis of the wheel, each partition extending in a substantially radial direction from its pivot.

5. A wheel including an inner rim; a tire movable with respect to the rim; a plurality of cushioning members positioned in annular formation intermediate of the tire and the rim, flanges secured to the rim and serving as lateral guides for the tire and the cushioning members; and partitions interposed between the adjacent ends of consecutive cushioning members, each of the said partitions being free at one end and pivoted at its other end, and extending in a substantially radial direction from its pivot.

6. In a wheel, the combination with a plurality of hollow spokes supporting an inner rim, of a tire movable with respect thereto; pivoted partitions mounted respectively in said hollow spokes and projecting beyond the rim and dividing the annular space between said rim and tire into compartments; and a cushioning member disposed within and approximately filling each of said compartments; each of said spokes presenting walls adapted to engage the partition mounted within said spoke so as to limit the pivotal motion of said partition.

7. A wheel including an inner rim; a tire movable with respect to the rim; a plurality of cushioning members positioned in annular formation intermediate of the tire and the rim; and partitions interposed between the adjacent ends of consecutive cushioning members, each of the said partitions being free at one end and pivoted at its other end and extending in a substantially radial direction from its pivot, and stops for limiting the motion of the said partitions upon their pivots.

8. A wheel construction including a plurality of substantially radially slotted spokes; a bolt extending through each of the spokes near the inner end of the slot in the same and parallel to the axis of the wheel; a partition member pivoted upon each of the said bolts within the said slots, each partition member extending beyond the end of the spoke having the slot; and a plurality of cushioning members arranged in annular formation around the ends of the spokes, each of the said partition members having the ends of two of the said cushioning members abutted against opposite sides of the same.

In testimony whereof I have signed my name in presence of two subscribing witnesses.

FRANKLIN A. FROMMANN.

Witnesses:
 RUDOLPH WM. LOTZ,
 M. M. BOYLE.

Copies of this patent may be obtained for five cents each, by addressing the "Commissioner of Patents, Washington, D. C."